Jan. 22, 1952     H. O. ZANDER ET AL     2,583,196
TRUCK FOR TRANSPORTING UPRIGHT CYLINDERS
Filed May 19, 1947
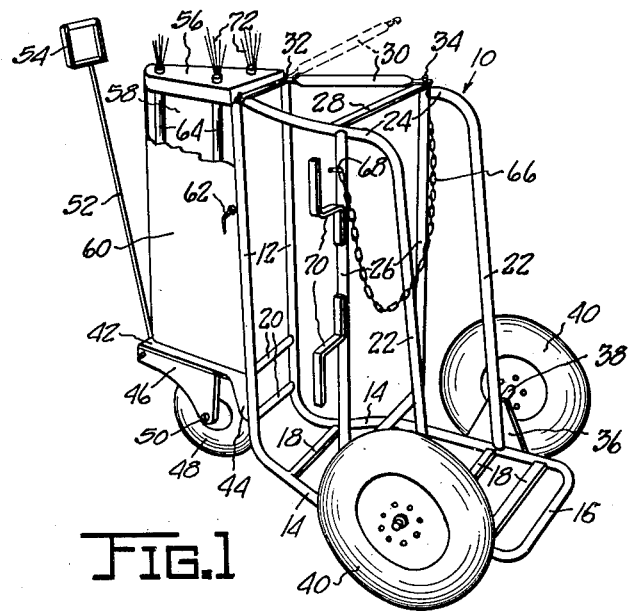
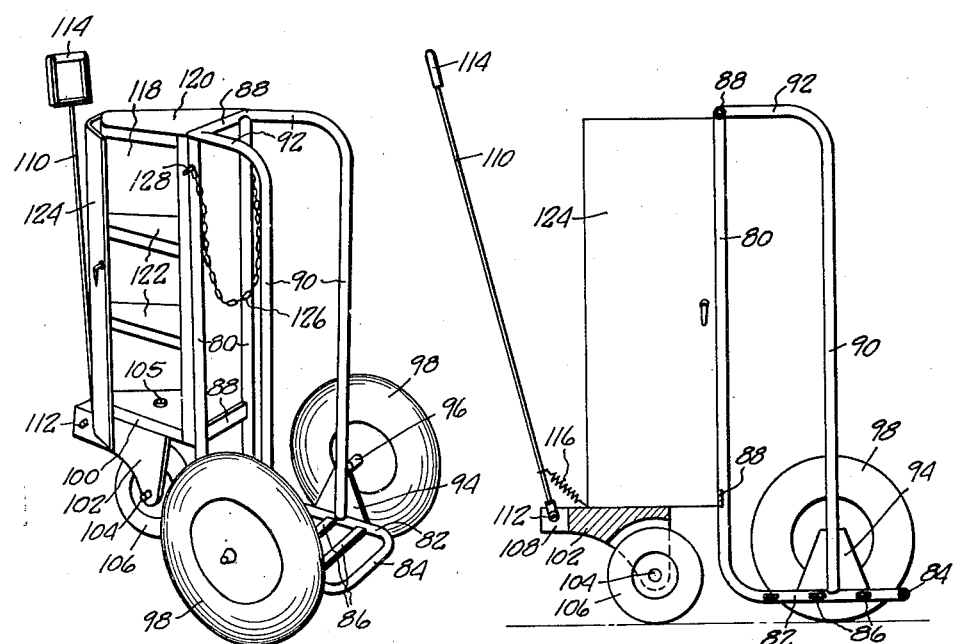
INVENTORS
HAROLD O. ZANDER AND
PAUL B. KUEHL.
BY Oltsch + Knobeock
ATTORNEYS.

Patented Jan. 22, 1952

2,583,196

UNITED STATES PATENT OFFICE 2,583,196

TRUCK FOR TRANSPORTING UPRIGHT CYLINDERS

Harold O. Zander and Paul B. Kuehl, South Bend, Ind.

Application May 19, 1947, Serial No. 748,878

4 Claims. (Cl. 280—59)

This invention relates to improvements in utility trucks, and particularly to trucks of the type which are used by welders, anaesthetists, and others who use cylinders and tanks containing gases and liquids in their work, and who must move their equipment and supplies, including such cylinders and tanks, from place to place.

The primary object of the invention is to provide a truck of this character which is sturdy, inexpensive, compact and stable, which requires only a small amount of space for its storage, which can be manipulated to pass through narrow passages and aisles, and which is easy to load and to pull or transport.

A further object is to provide a truck having three supporting wheels to render it stable and a low level, vertically elongated frame for solidly supporting heavy elongated cylinders thereon, which truck is easy to steer, which affords convenient storage space for small tools, instruments and other items, which has no projecting parts, and which is self-supporting so that the user does not need to exert any substantial effort to move and propel it.

A further object is to provide a light weight truck of great strength, whose parts are all readily accessible, which is stable while being loaded and unloaded, which is balanced when loaded or unloaded, which has a storage space or chamber supported by vertical tubular frame elements open at their upper ends and closed at their bottom ends so that elongated tools and parts may be supported in said tubes, and which has a draft tongue which is spring-urged to a convenient substantially upright normal position.

Other objects will be apparent from the following specification.

In the drawing:

Fig. 1 is a perspective view of one form of the truck.

Fig. 2 is a perspective view of another embodiment of the truck.

Fig. 3 is a side view of the truck shown in Fig. 2 with parts shown in section, taken longitudinally and vertically thereof.

Referring to the drawing, and particularly to Fig. 1, the numeral 10 designates the frame of a truck which is formed of tubular metal bent to shape and which has a pair of upright intermediate frame parts 12 which are bent at their lower ends to form horizontally extending marginal portions 14 of a platform, said runs 14 being preferably joined by a transverse portion 16 at their rear ends. A plurality of crossbars 18 extend between and are welded or otherwise suitably secured to the marginal frames 14 to support articles resting upon the platform. The upright elements 12 are preferably secured together rigidly by a plurality of crossbars 20. A pair of upright tubular bars 22 are secured at one end thereof as by welding to one of the frame runs 14 of the main frame and extend upwardly therefrom and have forwardly bent tubular portions 24. One of said tubular portions 24 extends to and is welded or otherwise secured to the adjacent upright tube 12. The other tubular portion 24 terminates in rearwardly spaced relation to the uprights 12 and is welded to the upper end of a tubular vertical bracing member 26 whose lower end is welded to one of the longitudinal frame runs 14. Two vertical reinforcing bars 26 are provided in transverse alignment as illustrated, and a crossbar 28 is fixedly secured to the frame members 24 and 26 as shown. A bar 30 is pivoted to one of the frame members 12 at 32 and is adapted to be anchored at its opposite end at 34, as by means of a screw or the like, to the junction point of the adjacent frame members 24, 26 and 28.

Each of the horizontal platform frame members 14 has fixedly secured thereto, at a point adjacent the point at which the frame members 22 are secured to said frame, a rigid plate 36. The upper end of each of these plates rigidly mounts a spindle or shaft 38 projecting outwardly therefrom and journaling a wheel 40. The shafts 38 for the two wheels 40 are axially aligned and are positioned forwardly from the rear platform frame member 16. The wheels 40 may be of any suitable construction and we prefer to use a rubber-tired wheel as shown. The parts are so related and the wheels are of such size that they serve to support the platform frame 14, 16 at a level slightly above the level of the surface which the wheels engage and ride upon. Thus a clearance of only an inch or more may occur between the platform frame 14, 16 and the floor.

A forwardly projecting rigid platform 42 is fixedly secured to the front of the inner frame members 12 at a level above the frame members 14 and 16 as by welding or other engagement between these parts. This platform is suitably reinforced as by the wing flanges 44 secured to the members 12. A castor frame 46 is pivoted to the platform 42 intermediate said platform about a vertical axis, and the castor frame journals a comparatively small wheel 48 on a shaft 50. The wheel 48 is of such size that it fits freely below the platform 42 to support the front part of the truck and cooperates with the large rear wheels 40 to hold the platform parts 14 and 42 in a horizontal position. The castor frame 46 has pivotally connected thereto an elongated tongue 52 whose upper end terminates in a handle 54. Suitable spring means may be employed to normally position the tongue 52 upright when the tongue is released.

A housing is supported upon the front platform 42. Said housing has a top 56, a fixed side wall 58, and a pivoted side wall 60 provided with an operating handle 62. A plurality of vertical tubes 64, here shown as three in number, are secured at their lower ends upon the platform 42 and serve to support the housing top 56. The tubes 64 are closed at their bottom ends by the platform 42 and project upwardly through the housing top 56 so that their upper ends are open. If desired, suitable shelves or partitions may be positioned within the housing 56, 58 supported on the tubes 64.

The truck shown in Fig. 1 is primarily intended for use by welders and provides means for supporting two vertically elongated cylinders or tanks. Thus in acetylene welding a tank or cylinder of acetylene gas and another tank or cylinder of compressed air are required. One of these tanks may be supported on the rear portion of the platform at a position rearwardly of the bars 26, and the other cylinder may be supported upon the front part of the platform forwardly of the bars 26. These tanks or cylinders will rest upon the frame parts 14, 16 and 18, it being understood that the spacing and arrangement of the upright tubular members 12, 22 and 26 is such as to afford a skeleton framework or cage within which the cylinders or tanks are confined. The cylinder or tank (not shown) which is to be positioned forwardly of the tubes 26 may be mounted upon the truck from the side thereof, for which purpose the bar 30 may have its securing member 34 released so that it may swing forwardly to the dotted line position, thus affording an opening in the framework of the truck through which the tank or cylinder may be inserted. It will be understood that the tank or cylinder in this instance will be of greater height than the vertical spacing between the platform members 14 and 18 and the upper frame parts 24, 28 so that after the tank is properly positioned upon the platform it will project above the frame parts 24, 28 to be retained thereby, and the frame part 30 may be returned to its full line position shown in Fig. 1 to close the opening through which the tank has been inserted.

Another tank can be loaded upon the platform from the rear thereof and will be positioned between the upright frame members 22. An elongated retainer, such as a chain 66 or a cable, is anchored to the upper end of one of the frame members 26 and is provided with suitable locking means at its opposite end adapted to engage and interlock with a projection 68 upon the opposite frame member 26. This chain or cable 66 will be passed around the tank supported by the rear of the truck to hold it firmly in place. The platform is so constructed that the rearmost tank will be positioned adjacent the axles 38 of the wheels 40 so that the weight of the tank will not unbalance the truck when the front compartment of the truck is empty.

Acetylene welding requires the use of elongated tubing for supply of the air and gas from the various cylinders and tanks and, therefore, one of the frame members 26 may be provided with brackets 70 about which such tubing may be wound to hold it in a compact manner. A welder may also require the use of elongated welding rods, and these welding rods are shown diagrammatically at 72, being supported or retained within the tube 64 of the front portion of the device.

It will be apparent that the truck holds two tanks in a thoroughly stable and balanced manner, the two tanks or cylinders being positioned lengthwise of the truck, that is, one thereof is positioned at the longitudinal center of the truck, and the other is positioned at the rear of the truck. Consequently, the device is quite narrow and can easily be moved through narrow passages and aisles. This is of particular importance in manufacturing plants where it is necessary to move the truck with the welding equipment thereon from place to place past machinery and through small passageways. It will be noted that after the truck has been loaded the stability afforded by its three wheels holds all of the parts steady and prevents any unbalance of the load. Thus it is not necessary for the user to carry any part of the weight of the load when moving the truck from place to place. Heretofore it has been customary for welders to use two-wheeled hand trucks to move their equipment, and particularly the tanks or cylinders, from place to place, such trucks being of the type which are tilted to be pushed or trundled about from place to place and requiring at least part of the weight of the load to be supported by the user. The instant device affords substantial advantage over such two-wheeled trucks because it will always stand steady, hold the load in a stable position, and avoid the necessity of the user carrying any part of the weight of the load. The instant truck is also narrower than the average two-wheeled truck of the type mentioned and therefore can be moved through passages narrower than will accommodate a two-wheeled truck. The provision of the housing in conjunction with the truck enables the user to carry with him small tools and instruments and other equipment without danger of losing the same and without individual handling or carrying thereof as has been necessary heretofore with other types of load trundling equipment. The castor mounting of the front wheel 48 enables sharp turns of small radius to be made, and the tongue 52 affords a convenient handle which the user may grip to pull and propel the truck.

Another embodiment of the invention, which is intended for use by technicians and mechanics who need to use only one tank or cylinder in their work, is illustrated in Figs. 2 and 3. In this form of the invention a pair of metal tubular members 80 are positioned in laterally spaced relation and have horizontal runs 82 bent therefrom at their lower ends and joined together at their rear ends by the transverse bar 84. Crossbars 86 span the frame members 82 and are welded or otherwise secured thereto in longitudinally spaced relation. Crossbars 88 interconnect and reinforce the uprights 80. At an intermediate point of each of the horizontal frame members 82 is welded or otherwise secured an upright frame member 90, said frame members 90 being transversely aligned and being forwardly bent at 92 at their upper ends and welded or otherwise fixedly secured to the joint between the members 80, 88 of the frame. Upwardly projecting rigid plates 94 are welded or otherwise suitably secured to the frame members 82 intermediate their length and support shafts or axles 96 which are transversely aligned and project outwardly to journal wheels 98 of such diameter that the horizontal frame members 82 are supported thereby clear of the supporting surface on which the wheels 98 ride but at a low level compared to the axis of rotation of said wheels. A rigid platform 100 is carried by the frame members 80 and projects forwardly therefrom in a substantially horizontal plane at a level substantially above the level of the frame runs 82. A castor frame 102 is pivoted at 105 to an intermediate portion of the platform 100 and mounts a shaft 104 on which a wheel 106 is journaled, said wheel being of a size to rotate freely beneath the platform 100 and serving in cooperation with the wheels 98 to hold the platform 100 and the frame runs 82 in a substantially horizontal position. The forward end of the castor frame 102 projects beyond the front of the platform 100 and may be slotted at 108 to receive the lower end of a tongue 110 which is pivoted thereto at 112. The upper end of the tongue 110 carries a handle 114. A spring 116 may be anchored at one end to the tongue 110 spaced above axis 112 and at its opposite end to the platform 100. The spring 116 is of such a length, position and tension that it will normally hold the tongue 110 in a substantially upright position as shown, but will extend to permit the tongue to be lowered substantially and in a manner to pull directly upon the castor frame 102.

A housing is mounted upon the platform 100, said housing having one vertical side wall 118, a top panel 120 and a plurality of horizontal shelves 122, which parts are secured to each other and to the frame parts 80, 88 and the platform 100 to provide a rigid construction. The opposite side of the housing is adapted to be closed by a panel 124 pivoted at the front of the cabinet about a vertical axis whereby one side of the housing may be opened for access to material stored therein.

The parts are so related that the axles 96 of the wheels 98 are located closer to the rear platform member 84 than to the upright frame members 80. Thus, when a tank or cylinder is mounted upon the platform and urged forwardly to the full extent accommodated by the device, that is, until the cylinder bears against one of the front crossbars 88, the weight thereof will be positioned forwardly of the wheel axles 96. A chain or other retainer 126 is mounted at one end of the upper end of one of the frame members 80 and is provided at its opposite end with a suitable latch adapted to engage a projection 128 upon the opposite frame member 80. In this construction the device is more compact than in the Fig. 1 construction, and for this reason it is desirable that the location of the wheels 98 be slightly rearwardly of the center of the longitudinal dimension of the supporting platform 82, 84, 86 in order to insure stability of the device. This form of the device otherwise has the same advantages as the Fig. 1 construction, including the light weight afforded by its tubular form without sacrifice of required strength.

While the embodiments of the invention herein described and illustrated are preferred, it will be understood that changes may be made therein within the scope of the appended claims without departing from the spirit of the invention.

We claim:

1. In a utility truck for transporting heavy elongated articles, a rigid unitary tubular metal frame having a horizontal article-supporting platform portion and an elongated upright cage portion for holding said article upright and defined by a plurality of longitudinally and transversely spaced interconnected upright elements, said cage being open at one side thereof, a pair of upwardly projecting rigid members located at opposite sides of said platform portion intermediate the ends thereof, means carried by the upper ends of said members and adapted for journaling wheels about aligned axes to position said platform at a low level, a forwardly projecting platform carried by said frame at a level above said first platform, a housing carried by said second platform, a wheel mounting member swiveled to an intermediate portion of said second platform and positioned therebelow, and a releasable retainer carried by the upright portion of said cage portion at the open side thereof and adjacent to the upper end thereof.

2. In a utility truck for transporting heavy elongated articles, a rigid frame including rigidly interconnected members defining an article support having an article supporting platform and upwardly projecting side retainer portions, rigid means projecting upwardly from intermediate portions of opposite sides of said platform and adapted for mounting wheels to position said platform at a low level, a forwardly projecting rigid horizontal plate carried by said frame at a level above the level of said platform, a housing supported on said plate forwardly of said retainer portions, means for swiveling another wheel to an intermediate portion of and below said plate, said platform being elongated to define two relatively longitudinally disposed article retaining cages, the upper portion of said frame being interrupted at one side adjacent to said housing and forwardly of said upwardly projecting wheel mounting means for lateral access to the foremost cage and at its rear for end access to the rear cage, and retainer means carried by the upper portion of said frame for releasably spanning said frame interruptions.

3. In a utility truck for transporting elongated cylinders, a plurality of rigidly connected tubular members defining an L-shaped main frame and a pair of inverted L-shaped members at its sides cooperating with said frame to define a cylinder retaining cage open at one side, rigid horizontal cylinder supporting platform defining means carried by the lower horizontal portion of said main frame, and forming a base for said cage, means carried by the lower end of said main frame and adapted for journaling a pair of wheels on a common axis spaced above said platform, whereby said base is positioned at a low level, a rigid member projecting forwardly from said frame above the level of said platform, dirigible means for journaling a comparatively small wheel below said projecting member and forwardly of said frame, and releasable retainer means carried by the upper end of said cage to span the open side thereof.

4. In a utility truck, a plurality of rigidly connected tubular members defining an L-shaped main frame and a pair of side portions, rigid horizontal platform-defining means carried by the lower horizontal portion of said main frame, means carried by the lower end of said main frame and adapted for journaling a pair of wheels on a common axis spaced above said platform and between and spaced from the ends of the platform, a rigid member projecting forwardly from said frame above the level of said platform, and dirigible means for journaling a comparatively small wheel below said projecting member, said platform being longitudinally elongated to support at least two vertically elongated cylinders in longitudinally arranged upright position, and supported by said side portions to prevent tilting, one of said side portions being interrupted forwardly of said first wheel mounting means to accommodate mounting of a cylinder upon the forward portion of said platform from the side of the truck.

HAROLD O. ZANDER.
PAUL B. KUEHL.

REFERENCES CITED

The following references are of record in the file of this patent:

UNITED STATES PATENTS

| Number | Name | Date |
|---|---|---|
| D. 148,412 | Goodman | Jan. 20, 1948 |
| 978,344 | Wirt | Dec. 13, 1910 |
| 1,080,578 | Peppe | Dec. 9, 1913 |
| 1,176,978 | Parker | Mar. 28, 1916 |
| 1,244,030 | Cave | Oct. 23, 1917 |
| 2,131,673 | Robinson | Sept 27, 1938 |
| 2,291,984 | Ponselle | Aug. 4, 1942 |
| 2,313,868 | Garlinghouse | Mar. 16, 1943 |
| 2,371,055 | Le Tourneau | Mar. 6, 1945 |
| 2,372,585 | Klumb et al. | Mar. 27, 1945 |